(12) United States Patent
Jacobs et al.

(10) Patent No.: US 8,227,521 B2
(45) Date of Patent: Jul. 24, 2012

(54) FLUOROPOLYMER FOAMS PREPARED WITH THE USE OF BLOWING AGENTS AND APPLICATIONS THEREOF

(75) Inventors: Paul Jacobs, Surrey (GB); Roger Lock, Surrey (GB); Neil Witten, Surrey (GB)

(73) Assignee: Zotefoams PLC (GB)

( * ) Notice: Subject to any disclaimer, the term of this patent is extended or adjusted under 35 U.S.C. 154(b) by 133 days.

(21) Appl. No.: 12/742,308

(22) PCT Filed: Nov. 12, 2008

(86) PCT No.: PCT/GB2008/003798
§ 371 (c)(1),
(2), (4) Date: May 20, 2010

(87) PCT Pub. No.: WO2009/063187
PCT Pub. Date: May 22, 2009

(65) Prior Publication Data
US 2010/0249255 A1  Sep. 30, 2010

(30) Foreign Application Priority Data
Nov. 12, 2007 (GB) .................................. 0722193.0

(51) Int. Cl.
| | |
|---|---|
| *C08F 14/00* | (2006.01) |
| *C08F 214/22* | (2006.01) |
| *C08F 12/20* | (2006.01) |
| *C08J 9/04* | (2006.01) |
| *B27N 3/08* | (2006.01) |
| *H01J 37/30* | (2006.01) |

(52) U.S. Cl. .......... 521/145; 264/239; 264/485; 521/50; 521/50.5; 524/851; 526/242; 526/255

(58) Field of Classification Search ............. 521/145, 521/50, 50.5; 264/239, 485; 524/851; 526/242, 526/255
See application file for complete search history.

(56) References Cited

U.S. PATENT DOCUMENTS

| | | |
|---|---|---|
| 3,770,662 A | 11/1973 | Hennessy et al. |
| 6,232,357 B1 * | 5/2001 | Barbieri et al. ............... 521/145 |
| 2007/0293592 A1 | 12/2007 | Jacobs et al. |

FOREIGN PATENT DOCUMENTS

| | | |
|---|---|---|
| EP | 1 640 410 A | 3/2006 |
| JP | 10 007833 A | 1/1998 |
| WO | WO 02/12379 A | 2/2002 |
| WO | WO 2005/105907 A | 11/2005 |

* cited by examiner

*Primary Examiner* — Timothy J. Kugel
(74) *Attorney, Agent, or Firm* — Joseph T. Leone, Esq.; DeWitt Ross & Stevens S.C.

(57) ABSTRACT

Fluoropolymer foams are prepared by mixing fluoropolymer resin with blowing agents and additives to produce foamable compounds at temperatures below the activation temperature of the blowing agent. The compounded material is expanded at temperatures above both the softening point of the fluoropolymer resin and the activation temperature of the blowing agent. The resulting fluoropolymer foam can be fabricated into any desired shape, such as pipes, sheets, tapes, blocks and rods, using techniques such as cutting, welding, thermoforming and adhesive bonding. Alternatively the fluoropolymer compound may be expanded directly into the desired shape, for example, by expanding the compound in a mold.

16 Claims, No Drawings

FLUOROPOLYMER FOAMS PREPARED WITH THE USE OF BLOWING AGENTS AND APPLICATIONS THEREOF

FIELD OF THE INVENTION

The present invention relates to fluoropolymer foams prepared using blowing agents and additives and applications thereof. High quality foams are produced by mixing the polymer material with blowing agents and additives to produce foamable compounds, shaping the compounded material and then expanding the compounded material. The mixture is crosslinked to allow the expansion to take place well above the normal softening point of the polymer material. The foams obtained can be fabricated into any desired shape, such as pipes, sheets, tapes, blocks and rods, using techniques such as cutting, welding, thermoforming and adhesive bonding. Alternatively the fluoropolymer compound may be expanded directly into the desired shape, for example, by expanding the compound in a mould. The foams are useful in applications where low density or electrical or thermal insulation are required. They have the additional benefits of high radiation and UV resistance, chemical resistance, thermal resistance and low flammability.

BACKGROUND

Foams are materials used in applications where light weight, flotation, thermal insulation, electrical insulation and cushioning effects are required. Foams made out of polystyrene, polyethylene of different densities and polyurethanes are widely known. However, foams made from these materials are limited in thermal resistance, chemical resistance, weathering resistance and ageing properties in general terms. Furthermore, standard types of such foams are highly flammable, and there is a need for foams in critical applications such as aerospace, mass transport, marine, construction, electrical, such as cable, electronic, microelectronic and semiconductor and chemical such as in the petrochemical industries for foams which also have chemical resistance, weathering resistance and good fire resistance. Foams made from fluoropolymers can fulfil these requirements.

U.S. Pat. No. 5,885,494 (du Pont) discloses a composite tubular structure which comprises a layer of first fluoropolymer and a substrate in contact with said layer, wherein the first fluoropolymer is foamable at a temperature at which the substrate is either less foamable or is non-foamable. The intention of the disclosed method is to prevent foaming of the substrate compared to the first fluoropolymer layer and one way of doing this is to crosslink the substrate material. There is no disclosure however of the first fluoropolymer layer being crosslinked.

U.S. Pat. No. 5,837,173 (Ausimont) relates to a process for preparing expanded articles based on ethylene-chlorotrifluoroethylene copolymers having high dielectric characteristics, in which nitrogen is injected directly into a molten polymer blend in a continuous process to result in expansion of the polymer. No crosslinking of the polymer is disclosed.

The U.S. Pat. No. 4,615,850 and U.S. Pat. No. 4,675,345 describe the use of chemical blowing agents combined with plasticizers and nucleating agents to produce foams of PVDF homopolymers and copolymers and their mixtures. The U.S. Pat. No. 5,883,197 and U.S. Pat. No. 6,506,809 describe the use of specific nucleating additives to achieve better quality foams, while the U.S. Pat. No. 4,425,443 describes the limitations of using certain chemical blowing agents, and in particular the thermal degradation of the resin which can occur. Again no crosslinking of the polymer is disclosed in any of these patents.

The patents EP 223155 and JP 06047857 A describe the use of a solvent, preferentially dichlorodifluoromethane as the expansion agent for fluoropolymer foams. The materials are not crosslinked and these processes have the disadvantage of using costly solvents which must be carefully removed so as not to deteriorate chemical resistance and/or purity.

WO 2005/105907 in the name of the present applicant describes the use of high pressure autoclaves to produce high quality fluoropolymer foams by directly impregnating formed artefacts with inert gas and then reducing the pressure to expand the material. The fluoropolymer resins are crosslinked to allow the impregnation and expansion processes to take place well above the normal softening point of the resin.

SUMMARY OF THE INVENTION

The present invention relates generally to a method and products made by this method which allows the production of high quality fluoropolymer foams by use of blowing agents. Fluoropolymer resins are mixed with blowing agents and formed to shape at a temperature below the activation temperature of the blowing agents. The formed shape may then be crosslinked before being heated under pressure to a temperature above both the softening point of the resin and the activation temperature of the blowing agent. Reducing the pressure while still above the softening point of the resin allows the formed shape to be expanded to produce a foam. The expansion stage may take place in a press or a pressure vessel.

DETAILED DESCRIPTION

In a first aspect of the present invention there is provided a process for making an open, semi-open or closed cell fluoropolymer foam comprising the steps of:

1a) mixing a fluoropolymer resin and a blowing agent to produce a compound, wherein the blowing agent is in non-gaseous form or a form in which gas is not liberated from the blowing agent 1b) forming or shaping an artefact from the compound 1c) heating the artefact under pressure to a temperature above the softening point of the resin and above an activation temperature of the blowing agent in order to convert the blowing agent to a gaseous form or to liberate gas from the blowing agent 1d) reducing the pressure while maintaining the temperature above the softening point of the resin in order to expand the material 1e) cooling the resultant fluoropolymer foam to ambient temperature wherein the compound is preferably crosslinked after step (1b).

As defined above, the blowing agent is a substance which exists in non-gaseous form or a form in which gas is not liberated therefrom below its activation temperature and either exists in gaseous form or liberates gas (by decomposition for example) above its activation temperature. The technical advantage of using such a substance is that it can be combined with the fluoropolymer resin in its non-gaseous form and then moulded or formed without the blowing agent causing expansion of the resin. When the resin/blowing agent compound is in the desired shape, the blowing agent can then be converted to its gaseous form by heating it to a temperature above its activation temperature.

The blowing agent may be an endothermic or exothermic chemical blowing agent or alternatively may be a material known to produce volatile decomposition products. Another alternative is to provide the blowing agent in the form of a gas encapsulated in a solid carrier which releases the gas above the activation temperature, and it is intended that this be encompassed within the definition "non-gaseous form" above.

It has been discovered that crosslinking the compound prior to expansion (i.e. after step (b)), helps to make a low density foam product. This is in contrast to the use of crosslinking in U.S. Pat. No. 5,885,494 mentioned above, in which crosslinking is employed in order to increase molecular weight and reduce expansion of the substrate layer.

Crosslinking prior to expansion allows the process to be operated above the softening point of the resin without severe detrimental flow of the material. The process can also be operated without crosslinking but this restricts the flexibility of the process. Crosslinking can be obtained by use of crosslinking agents known to those skilled in the art (e.g. triallylcyanurate) and subsequent exposure to ionising radiation (e.g. electron beam or gamma irradiation). Preferentially, no chemical crosslinking or crosslink promoters are used but only crosslinking by ionising radiation is employed. Typical doses for irradiation crosslinking are in the range of 5 to 200 kGy, but a preferential range is 25 to 100 kGy.

Advantageously, in step (b), the fluoropolymer resin and blowing agent compound is formed into the desired shape, typically a thick sheet although thin sheet and many other shapes may be contemplated, using any of the techniques known to those skilled in the art, for example, extrusion, injection moulding or compression moulding.

Alternatively, the fluoropolymer resin and blowing agent compound from step (a) may be heated in a mould whereupon the heat causes the fluoropolymer resin to soften and expand into the mould. The result is a fluoropolymer foam artefact of a defined shape. This process is distinct from the thermoforming process in which previously expanded foam is heated and then moulded to the desired shape.

Thus in a second aspect of the present invention there is provided a process for making fluoropolymer foam comprising the steps of:
  a) mixing of the fluoropolymer resin and blowing agent to produce a compound wherein the blowing agent is in non-gaseous form
  b) heating the compound under pressure to a temperature above the softening point of the resin and the activation temperature of the blowing agent
  c) reducing the pressure while still above the softening point of the resin to a pressure higher than atmospheric pressure but lower than the initial pressure
  d) cooling the resin to below its softening point to result in a partially expanded fluoropolymer foam.

It is particularly preferred that the invention relate to a batch process rather than a continuous or semi-continuous process. In other words, discrete batches of artefacts are individually treated in pressure vessels rather than a potentially infinite length of shaped compound being treated in a continuous process for example in an extruder with ovens combined.

In a third aspect of the present invention there is provided a continuous or semi-continuous process for making closed cell fluoropolymer foam comprising the steps of:
  a) mixing of the fluoropolymer resin and blowing agent to produce a compound wherein the blowing agent is in non-gaseous form
  b) forming or shaping the compound into a sheet, film, tape, rod, tube or other continuous or semi-continuous form
  c) heating the artefact without the application of direct pressure to a temperature above the softening point of the resin and the activation temperature of the blowing agent in order to expand the material
  d) cooling the resultant fluoropolymer foam to ambient temperature The compound is preferably crosslinked either in-line or off-line prior to expansion step (c), with the expansion step taking place in either an oven, salt bath or other heating device or combination of devices known to those skilled in the art. It is particularly preferential to crosslink the compound by means of ionising irradiation (e.g. electron beam or gamma irradiation).

The present invention also relates to the fluoropolymer foams made by the disclosed process, with preference for VDF (vinylidene difluoride)-based polymers and its thermoplastic copolymers.

The present invention also relates to:
  the transformation of said fluoropolymer foams by welding, gluing, cutting, routing, punching, stamping, laminating and thermoforming into any desirable shape such as pipes, rods, sheaths, containers, balls, sheets, rolls and tapes
  the use of said fluoropolymer foams in flotation devices,
  the use of said fluoropolymer foams in any desired shape in thermal and/or acoustic insulation,
  the incorporation of said fluoropolymer foams together with sheets, films, foams, textiles, reinforcements or any other natural or synthetic material known to those skilled in the art (such as fabric or leather) into complex structures by lamination, adhesive bonding, sewing and other permanent or temporary fastening techniques,
  the use of said fluoropolymer foams in any desired shape in electrical insulation,
  the use of said fluoropolymer foams in packaging material or in containers,
  the use of said fluoropolymer foams in high purity applications in cleanroom panels, seals, insulation and in equipment,
  the use of said fluoropolymer foams in gaskets or seals,
  the use of said fluoropolymer foams in sensing devices,
  the use of said fluoropolymer foams in self-extinguishing fire barriers, or
  any combination of any aforesaid use.

As regards the fluoropolymer, foamable fluoropolymers are of such a type that they can be transformed by extrusion, injection moulding, compression moulding or other forming techniques known to those skilled in the art. The fluoropolymers can be semicrystalline or amorphous, preferably they are semicrystalline. Preferably the fluoropolymers can be radiation crosslinked.

Preferably the fluoropolymer is PVDF or a copolymer of PVDF with comonomers hexafluoropropylene (HFP) or chloro-trifluoro-ethylene (CTFE) a mixture of two or more of such polymers, or ECTFE the ethylene-chlorotrifluoroethylene copolymer, or ETFE the ethylene-tetrafluoroethylene copolymer.

Fluoropolymers and copolymers of VDF, such as KYNAR® (Arkema) collectively VDF-based polymers, wherein the VDF portion is greater than the total molecular percent of comonomers, are well known and widely used. Among the variety of fluoropolymers based upon tetrafluoroethylene, chlorotrifluoroethylene, and other specialty fluorine-containing monomers, the VDF-based polymers are unique, offering the widest possible range of processing options to obtain articles having the beneficial attributes associated with improved chemical resistance and surface properties. Thus, among the wide spectrum of fluoropolymers currently used, the VDF-based polymers may be melted in typical processing equipment for thermoplastic resins for extrusion or moulding or combinations such as extrusion-blown film and moulding.

VDF-based polymers can be made by copolymerization of VDF and HFP and/or by substitution or addition of one or more of other fluoromonomers, which include but are not limited to, tetrafluoroethylene (TFE), chlorotrifluoroethylene (CTFE), perfluoromethyl vinyl ether (PMVE), perfluoropropyl vinyl ether (PPVE), perfluoroalkyl vinyl ether (PAVE), vinyl fluoride (VF), trifluoroethylene (TrFE), for some or all of the hexafluoropropylene. Also contemplated are any other polymers which are melt processable and crosslinkable by any other means, for example, free radical crosslinking.

One skilled in, the art will recognize that small quantities of a third monomer known to be copolymerizable with VDF (up to about 10% by weight of the HFP level) may also be included in the above described resins. Such known copolymerizable monomers may, for example, be selected from among C(3-8) alkenes containing at least one fluorine atom, an alkyl vinyl ether containing at least one fluorine atom, an aliphatic or cyclic C(3-6) ketone containing fluorinated $\alpha$-$\alpha'$ positions and non-fluorinated C(2-4) alkenes, C(3-6) alkyl vinyl ethers or C(4-6) vinyl esters. An example of a thermoplastic terpolymer is Dyneon THV which is a polymer of VDF, HFP and TFE.

As regards the PVDF copolymer, the proportion of VDF is at least 60% by weight and preferably at least 85% by weight. The comonomers are advantageously chosen from HFP, CTFE, TFE and TrFE. The fluoropolymer resins may be pigmented or include other additives, modifiers or reinforcements. In one preferred embodiment of this invention they may contain functional additives such as flame and smoke suppressants or antistatic additives.

As regards the blowing agent, this may be selected from the number of endothermic or exothermic chemical blowing agents, and preparations thereof, which include but are not limited to sodium bicarbonate, citric acid, monosodium citrate, azodicarbonamide, toluenesulphonyl hydrazide, benzenesulphonyl hydrazide, toluenesulphonylacetone hydrazone, 4,4'-oxybis(benzenesulphonyl hydrazide), p-toluenesulphonyl semicarbazide and 5-phenyltetrazole. Alternatively, the blowing agent may be a material known to produce volatile decomposition products, which include but are not limited to the water-releasing metal hydroxides aluminium trihydrate (ATH) and magnesium hydroxide. Finally the blowing agent may be selected from the number of gases or volatile liquids which are known to be a physical blowing agents and include, but are not limited to, air, nitrogen, carbon dioxide, argon, hydrogen, helium, halogenated hydrocarbons (CFCs and HCFCs), alcohols, ethers, ketones, aromatic hydrocarbons and water. Such physical blowing agents may be introduced into the polymer resin by means of a solid carrier material, such as a polymer granule or porous medium, or through encapsulation in expandable microspheres (e.g. Expancel). This is unlike the process described in WO 2005/105907 in which the use of inert gases as physical blowing agents by direct absorption into the crosslinked fluoropolymer artefact is disclosed.

In addition to the blowing agent, the fluoropolymer resins may also be pigmented or include other additives, modifiers or reinforcements known to those skilled in the art, including nucleating agents and functional additives such as flame and smoke suppressants.

As regards the process, in step (a) the material is processed at a temperature necessary to melt, mix and homogenise all components of the formulation without activation of the blowing agent. In the preferred embodiment of extrusion, the equipment, temperatures and pressures should be obvious to those skilled in the art.

In step (c) described in the first aspect of the current invention above, the fluoropolymer resin and blowing agent compound artefact from step (b) is transferred to a pressure vessel and is heated to a temperature which is above the softening point of the fluoropolymer resin and is above the activation temperature of the blowing agent. In all cases, the temperature is such that the resin is sufficiently soft to allow expansion to occur on release of the pressure in step (d). The temperature is advantageously at or above the melting point if the fluoropolymer is semi-crystalline. In a preferred embodiment it is 15 to 135° C. above the melting point. The pressure is preferably from 5 to 200 bar, more preferably 5 to 40 bar and most preferably 10 to 20 bar during the heating process. Once the sheet is evenly heated and all gas has been realised from the blowing agent, the pressure is reduced allowing the material to expand to produce an open, semi-open or closed cell fluoropolymer foam.

The fluoropolymer resin and chemical blowing agent or additive from step (a) may alternatively be heated in a mould under atmospheric pressure, as described in the second aspect of the current invention. The heat causes the activation of the blowing agent as well as causing the fluoropolymer resin to soften and expand into the mould, resulting in an open, semi-open or closed cell fluoropolymer foam artefact of the desired shape.

As a result of the flexible nature of the process expansion ratios from less than 2:1 to greater than 75:1 can be achieved (i.e. the foam density ranges from >1000 kg/m$^3$ to <20 kg/m$^3$). In addition, the process yields foams that have a high degree of homogeneity in terms of composition, density and cell size.

As regards the uses of the foam, the foams are usually produced in the form of sheets. The sheets can be cut using a bandsaw, water-jet cutter, router or any other technique known to those skilled in the art. They can be hot welded by standard techniques to form laminates with any desired thickness. The sheets can be cut into strips of any thickness. The fluoropolymer foam can be thermoformed into many shapes by use of a heatable mould. For instance rings, cups, half pipes, bowls, buckets, balls or oval shaped objects can be obtained. The surface will have a closed skin due to a healing effect of the outermost cell walls. The sheets can be thermoformed and fixed to form a thermal or sound insulating layer for piping systems, vessels and containers. As a result of their intrinsic chemical and radiation resistance, as well as fire resistance coupled with low flame and smoke evolution and intrinsic high purity, the fluoropolymer foams are particularly interesting for insulation purposes in chemical, electronic, microelectronic, pharmaceutical, oil and gas exploration and production, oil and gas refining, building and construction and nuclear industries. The sheets can be cut and/or thermoformed to form seals and gaskets. The sheets can be cut and/or thermoformed to obtain cable and wire electrical insulation with high flame resistance and low dielectric strength. Objects produced from fluoropolymer foam can be formed into chemically and radiation resistant floats. Shaped objects of fluoropolymer foam can be assembled with other materials by bonding with adhesives such as pressure sensitive adhesives or solvent based adhesives, for instance a solution of 5% Kynar® 721, a PVDF homopolymer in powder form from Arkema, having an MVI (melt volume index) of 10 cm$^3$/10 min (230° C./5 kg) dissolved in DMA (dimethylacetamide), or using heat lamination techniques.

Example 1

A slab of PVDF resin containing aluminium trihydrate as the blowing agent was prepared by melt mixing Kynar Flex Foam Concentrate XRU-1197 granules (Colorant Chromatics) in an internal mixer and then pressing the material into a mould. Care was taken to ensure that the activation temperature of the blowing agent was not reached during either the compounding or pressing stages. The blowing agent containing PVDF slab was then irradiated by electron beam to a dose of 40kGy. The crosslinked slab was then placed in a pressure vessel into which nitrogen was introduced to a pressure of 20 bar. The temperature was raised to 250° C. and the pressure vessel was maintained until the slab was of uniform temperature throughout. The pressure was then reduced to atmospheric pressure, allowing the slab to expand. The expanded PVDF foam was then removed from the pressure and allowed to cool. The resultant foam had a density of 138 kg/m$^3$.

Example 2

Slabs of PVDF resin containing 2.5%, 5.0%, 7.5%, and 10% MSCA (monosodium citrate anhydrous) as the blowing agent were prepared by melt mixing Kynar Flex 2500-20 (Arkema) with the blowing agent in an internal mixer and then pressing the material into a mould. Care was taken to ensure that the activation temperature of the blowing agent was not reached during either the compounding or pressing stages. The blowing agent containing PVDF slabs were then irradiated by electron beam to a dose of 60kGy. The crosslinked slabs were then placed in a pressure vessel into which nitrogen was introduced to a pressure of 17 bar. The temperature was raised to 230° C. and the pressure vessel was maintained until the slabs were of uniform temperature throughout. The pressure was then reduced to atmospheric pressure, allowing the slabs to expand. The expanded PVDF foams were then removed from the pressure and allowed to cool. The resultant foams, for the formulations containing 2.5%, 5.0%, 7.5%, and 10% MSCA, had densities of 295 kg/m$^3$, 195 kg/m$^3$, 154 kg/m$^3$ and 105 kg/m$^3$ respectively. Some physical property testing was performed on these foams and the results are collected in the table below.

The invention claimed is:

1. A process for making a fluoropolymer foam comprising the steps of:
   1a) mixing a fluoropolymer resin and a blowing agent to produce a compound, wherein the blowing agent is in non-gaseous form or a form in which gas is not liberated from the blowing agent
   1b) forming or shaping an artifact from the compound
   1c) heating the artifact under pressure to a temperature above the softening point of the resin and above an activation temperature of the blowing agent in order to convert the blowing agent to a gaseous form or to liberate gas from the blowing agent
   1d) reducing the pressure while maintaining the temperature above the softening point of the resin in order to expand the artifact
   1e) cooling the resultant fluoropolymer foam to ambient temperature wherein the compound is crosslinked by irradiating it with an electron beam or with gamma radiation after step (1b).

2. A process as claimed in claim 1 in which the fluoropolymer resin is a PVDF copolymer and the proportion of vinylidene fluoride (VDF) is at least 60% by weight.

3. A process as claimed in claim 2 in which the proportion of VDF is at least 85% by weight.

4. A method of using a fluoropolymer, the method comprising:
   incorporating a fluoropolymer foam produced by a method as claimed in claim 1 into one or more devices selected from the group consisting of flotation devices, thermal insulation, acoustic insulation, electrical insulation, packaging, containers, clean-room panels, seals, gaskets, and self-extinguishing fire barriers.

5. The method as claimed in claim 4, comprising incorporating the fluropolymer in the device via a technique selected from the group consisting of lamination, adhesive bonding, sewing, permanent fastening techniques, and temporary fastening techniques.

6. The method as claimed in claim 4, wherein the fluoropolymer is incorporated into a device comprising a structure selected from the group consisting of a sheet, a film, a foam, a textile, a reinforcement, and combinations thereof.

7. A process as claimed in claim 1 wherein the radiation dose is from 5 to 200 kGy.

8. A process as claimed in claim 1 wherein said temperature above the softening point of the resin is from 15 to 135° C. above the softening point of the resin.

9. A process as claimed in claim 1 wherein the pressure in steps (1c) and step (2a) is independently from 5 to 200 bar.

|  |  |  | Value (for identified Formulation) | | | |
| --- | --- | --- | --- | --- | --- | --- |
| Property | Test Method | Units | 10% MSCA | 7.5% MSCA | 5.0% MSCA | 2.5% MSCA |
| Density | ISO 845 | kg/m$^3$ | 105 | 154 | 195 | 295 |
| Compressive Stress | | | | | | |
| 25% compression | ISO 3386/1 | kPa | 61 | 62 | 144 | 394 |
| 40% compression | | kPa | 102 | 115 | 206 | 484 |
| 50% compression | | kPa | 142 | 173 | 264 | 577 |
| 60% compression | | kPa | 208 | 276 | 366 | 761 |
| Tear strength | BS EN ISO 8067 | N/m | 4156 | — | — | — |
| Tensile strength | ISO 1798 | kPa | 730 | 1243 | 1467 | 2116 |
| Elongation | | % | 244 | 190 | 210 | 238 |
| Shore hardness 00 scale | ISO868 | | 59.0 | 60.5 | 68.0 | 79.0 |

10. A process as claimed in claim 1 wherein the fluoropolymer foam is homogeneous.

11. A process as claimed in claim 1 which is a batch process.

12. A process as claimed in claim 1 which is a semi-continuous process.

13. A method of working a fluoropolymer foam, the method comprising:
   transforming a fluoropolymer foam produced by a method as claimed in claim 1 into a continuous or semi-continuous sheet, a roll or a tape of any desired thickness.

14. A process for making a fluoropolymer foam comprising the steps of:
   1a) mixing a fluoropolymer resin and a blowing agent to produce a compound, wherein the blowing agent is in non-gaseous form or a form in which gas is not liberated from the blowing agent
   1b) forming or shaping an artifact from the compound
   1c) heating the artifact under pressure to a temperature above the softening point of the resin and above an activation temperature of the blowing agent in order to convert the blowing agent to a gaseous form or to liberate gas from the blowing agent
   1d) reducing the pressure while maintaining the temperature above the softening point of the resin in order to expand the artifact
   1e) cooling the resultant fluoropolymer foam to ambient temperature
   wherein the compound is crosslinked after step (1b)
   in which the fluoropolymer compound is extruded into the form of a sheet.

15. A process for making a fluoropolymer foam comprising the steps of:
   1a) mixing a fluoropolymer resin and a blowing agent to produce a compound, wherein the blowing agent is in non-gaseous form or a form in which gas is not liberated from the blowing agent
   1b) forming or shaping an artifact from the compound
   1c) heating the artifact under pressure to a temperature above the softening point of the resin and above an activation temperature of the blowing agent in order to convert the blowing agent to a gaseous form or to liberate gas from the blowing agent
   1d) reducing the pressure while maintaining the temperature above the softening point of the resin in order to expand the artifact
   1e) cooling the resultant fluoropolymer foam to ambient temperature
   wherein the compound is crosslinked after step (1b)
   in which the fluoropolymer resin is a polyvinylidene fluoride (PVDF) homopolymer.

16. A method of working a fluoropolymer foam, the method comprising:
   1a) mixing a fluoropolymer resin and a blowing agent to produce a compound, wherein the blowing agent is in non-gaseous form or a form in which gas is not liberated from the blowing agent
   1b) forming or shaping an artifact from the compound
   1c) heating the artifact under pressure to a temperature above the softening point of the resin and above an activation temperature of the blowing agent in order to convert the blowing agent to a gaseous form or to liberate gas from the blowing agent
   1d) reducing the pressure while maintaining the temperature above the softening point of the resin in order to expand the artifact
   1e) cooling the resultant fluoropolymer foam to ambient temperature
   wherein the compound is crosslinked after step (1b) to yield a fluoropolymer foam
   transforming the fluoropolymer foam by welding, gluing, cutting, routing, punching, stamping, laminating or thermoforming the fluoropolymer into any desirable shape.

* * * * *